May 6, 1969

R. W. HODGSON ET AL

3,442,347

SAFE TRAILING DISTANCE MAINTENANCE SYSTEM
FOR A TRAILING CARRIER VEHICLE

Filed March 31, 1965

INVENTORS.
R. W. HODGSON
JAMES L. FRESON

INVENTORS.
R. W. HODGSON
JAMES L. FRESON

United States Patent Office 3,442,347
Patented May 6, 1969

3,442,347
SAFE TRAILING DISTANCE MAINTENANCE SYSTEM FOR A TRAILING CARRIER VEHICLE
Robert W. Hodgson, 1680 N. Vine St., Suite 240, Hollywood, Calif. 90028, and James L. Freson, Inglewood, Calif.; Mae Freson, 10224 6th Ave., Inglewood, Calif. 90303, surviving heir of said James L. Freson, deceased
Filed Mar. 31, 1965, Ser. No. 444,188
Int. Cl. B22d 19/12; G01s 9/04
U.S. Cl. 180—98                4 Claims

ABSTRACT OF THE DISCLOSURE

A safe trailing distance system for a trailing vehicle including radiation transmitting and receiving means, the ouput of the latter being connected to a visibly perceptible warning signal and/or brake operating means to reduce vehicle speed. Threshold gate means including reference value means are used to control the output of the receiving means, and speed sensing means can vary operation of the threshold gate means.

---

Generally speaking, the present invention relates to a safety system for a vehicle such as an automobile, truck, bus, or other vehicle, which, in one particular exemplary form, is intended for use in maintaining a safe trailing distance between a trailing carrier vehicle carrying the apparatus of the present invention and a leading vehicle so as to greatly reduce, or virtually prevent, the likelihood of a collision occurring between the front end of said trailing carrier vehicle and the rear end of a forwardly spaced leading vehicle of the type commonly known in the safety field as a "rear end" collision and which is a very common type of collision which annually results in a greater loss of life and property than perhaps all other types of accidents.

In one preferred exemplary form of the invention, it may be said to comprise a safe trailing distance warning system for such a trailing carrier vehicle which is effectively correlated with the speed of travel of said trailing carrier vehicle and which will provide a perceptible warning signal to the driver of said trailing carrier vehicle whenever said trailing carrier vehicle approaches too close to the rear end of a forwardly spaced leading vehicle for safety, taking into account the speed of travel of the trailing carrier vehicle and the necessary distance required for effectively stopping same by operating the braking system of said trailing carrier vehicle once it becomes apparent to the driver thereof that the leading vehicle has slowed down or stopped. Thus, this exemplary form of the invention, wherein it comprises a warning system, will greatly reduce the number of such "rear end" collisions since the driver of the trailing carrier vehicle will be appropriately warned when it is necessary for him to slow down in order to at all times achieve and maintain a safe distance between the front end of said trailing carrier vehicle and a leading vehicle to enable safe stopping of the trailing carrier vehicle without striking the rear of the leading vehicle. This, in itself, is believed to be a great advance since it will greatly reduce the number of such "rear end" collisions.

However, the present invention also includes and comprehends a system of the type referred to above which may actually comprise a control system for the trailing carrier vehicle, either in addition to a warning system of the type referred to above or as an alternative to or in lieu thereof, with said control system being essentially the same with respect to sensing and computing the safeness or unsafeness of the spacing between the front end of the trailing carrier vehicle and the rear end of the leading vehicle at different speeds and being additionally provided with, and having effectively coupled thereto, for operation thereby vehicle speed control means carried by the trailing carrier vehicle and operable for reducing the speed thereof whenever the unsafe spacing sensing portion of the apparatus indicates that the trailing carrier vehicle has approached too close to the rear end of the leading vehicle, thus effectively slowing down the trailing carrier vehicle until such time as the space between the trailing carrier vehicle and the leading vehicle increases to a safe distance. The speed control means just referred to may comprise various types of effective braking means or servomotor means effectively coupled in any suitable way with respect to the pre-existing conventional braking system of the trailing carrier vehicle, or may comprise motor speed control means such as governor means or the like, or any combination thereof for effectively reducing the forward speed of travel of said trailing carrier vehicle whenever the unsafe space sensing portion of the apparatus senses the fact that too short a space exists between the trailing carrier vehicle and the leading vehicle.

Of course, it should be understood that the apparatus of the present invention may comprise both a warning signal-producing system of the type first referred to above and a speed control system of the type second referred to above, or may comprise either type of control system without the other feature—all such arrangements being intended to be included and comprehended within the broad scope of the present invention.

It should be noted that the above-mentioned "rear end" collision traffic problem is an extremely important traffic problem most urgently requiring solution, since highway traffic statistics reveal that following too closely behind the vehicle ahead is a major cause of accidents and particularly of extremely serious accidents in which major damage to the vehicles involved is extremely likely to occur and in which very severe injury or death is likely to occur to at least one of the drivers or passengers in the motor vehicles involved in such an accident. Furthermore, since such accidents are extremely likely to occur and, indeed, traffic statistics show that they do occur, most frequently on high-speed freeways, turnpikes, or other highways or roads where no cross traffic is permitted and where very high-speed driving is the normal practice, the above problems are further aggravated and effectively magnified by reason of the high speeds involved when such accidents occur under such high-speed driving conditions. Therefore, various traffic laws exist in various areas of the country prohibiting close following in an attempt to minimize this problem, but traffic laws do not hold the answer because drivers are not always conscious of their violations or because drivers may be unable to judge the minimum vehicle spacing distance necessary for safety at different speeds.

Additionally, in an attempt to at least partially solve the above-mentioned "rear end" collision problem, various types of apparatus and equipment for motor vehicles have been developed in the past, such as the provision of rear end lights of the type commonly called "stop lights" or "brake lights" at the back end of motor vehicles, which go on or become illuminated when the brake pedal of such a vehicle is depressed, constituting one of the great advances in driver safety, since this clearly altered a trailing driver to the fact that a leading driver was slowing or stopping his vehicle so that the trailing driver could also immediately apply the brakes of his vehicle and correspondingly slow or stop same so as to avoid a "rear end" collision with the slowing or stopping leading vehicle.

Additionally, tail lights have been made bigger and bigger and brighter and brighter over the years to render them even more noticeable to trailing drivers. Nevertheless, "rear end" collisions continue to be a major hazard to the driving public and exact a frightful toll in human life due to the fact that the trailing driver is just not aware of the fact that he is too close to the leading vehicle until it is too late to avoid such a "rear end" collision.

Further prior art attempts to solve the above-mentioned problem have been made and have comprised the invention and development of certain types of warning systems intended to sense the fact that a trailing vehicle is too close to a leading vehicle and to provide, in response thereto, some sort of warning signal which may be visibly observed by the trailing driver and which is intended to alert him to the fact that he should reduce the speed of his trailing vehicle in order to avoid the possibility of such a "rear end" collision. However, most such apparatuses have been carried by the leading vehicle and have had a relatively large visibly observable warning device such as an illuminated panel, light, or, in some cases, use may be made of the existing stop lights or tail lights of the leading vehicle for this purpose, with such rear end warning lights or other apparatus being coupled to some distance sensing apparatus carried by the leading vehicle and which is adapted to sense the too close approach of a trailing vehicle and to then cause illumination of said warning lights or the like carried by the rear end of said leading vehicle so that, presumably, the driver of the trailing vehicle will look ahead and see the visibly perceptible illuminated warning signal carried by the rear end of the leading vehicle. This prior art type of warning system is disadvantageous for several reasons. First, it does not provide an extremely perceptible warning signal to the driver of the following vehicle in a manner which he cannot fail to perceive. This is so because of the fact that the warning signal is a very substantial distance ahead of the driver of the trailing vehicle and carried by the leading vehicle.

It would be much more desirable for the warning signal to be carried by the trailing vehicle very close to the driver thereof and of a nature such that he could hardly fail to perceive same and be immediately alerted to the fact that he has driven too close to the rear end of the leading vehicle and should immediately slow down. This would be a much more positive type of warning to the driver of the trailing vehicle than such a prior art system as that referred to above.

Additionally, such a prior art system is not capable of being coupled to a speed control means carried by the trailing vehicle and adapted to automatically reduce the speed of said trailing vehicle so as to prevent a possible "rear end" collision with the leading vehicle.

For the above-mentioned two reasons alone, it is believed to be completely apparent that a safety system for maintaining proper spacing between leading and trailing vehicles should be carried by the trailing vehicle, and such is the case with the improved and novel apparatus and system of the present invention.

Also, it should further be noted that most such prior art systems of the type referred to above, which are actually intended to effectively measure the distance between a leading vehicle and a trailing vehicle for use in rendering the warning system carried by the leading vehicle operative when said distance is below a safe value, have employed relatively complex distance measuring apparatus and equipment and, thus, have substantially eliminated the apparatus for many likelihood of general usage on motor vehicles because of the complexity and cost thereof.

With the above points in mind, it is an object of the present invention to provide a safe trailing distance maintenance apparatus and system for a trailing carrier vehicle which will, in one form, render a perceptible warning system operative at a location closely adjacent to a driver of the trailing carrier vehicle and in a manner which he can hardly fail to perceive and/or which will, in one form, also operate speed control means carried by said trailing carrier vehicle in a manner such as to effectively reduce the speed thereof until such time as the unsafe and inadequate space between the trailing carrier vehicle and a leading vehicle has been increased to a safe value. The apparatus and/or system of the present invention may embody either or both of these features either individually or in combination and in a number of variant forms, all within the broad scope and teachings of the present invention.

Additionally, it is a further object of the present invention to provide an apparatus and/or system of the character referred to in the preceding object which is of a relatively simple, non-complex, and relatively inexpensive nature such as to be conducive to the widespread usage thereof.

It is a further object of the present invention to provide an apparatus or system of the character referred to above which does not employ the relatively complex and relatively costly echo-ranging principle of various prior art systems intended for the same general purposes but which employs a totally different and very much simpler, less complex, and less costly principle for measuring the distance from the trailing carrier vehicle to a leading vehicle.

It is a further object of the present invention to provide an apparatus or system of the character referred to hereinabove which lends itself very readily to being installed at the factory on a motor vehicle as original equipment and/or which lends itself very well to being installed as a separate attachment system on a pre-existing motor vehicle.

It is a further object of the present invention to provide an apparatus or system of the character referred to herein, having any of the advantages referred to herein and/or including any of the features referred to herein, generically and/or specifically and individually or in combination.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention, several exemplary embodiments of the invention are illustrated, primarily in effectively simplified block diagrammatic and/or schematic form, in the hereinbelow-described figures of the accompanying four sheets of drawings and are described in detail hereinafter. It should be noted that most of the elements of the various forms of the invention illustrated are shown in the drawings in said simplified block diagrammatic and/or schematic form for purposes of drawing simplificaton and clarity since the invention resides primarily in the various combinations of such elements and the cooperative interrelationships thereof rather than in the specific internal details of each such element shown in block diagrammatic form in the figures of the drawings. Furthermore, the individual internal structure and details of each of the elements of the complete system, as shown in the drawings in simplified block diagrammatic and/or schematic form, are well known in the corresponding art (usually in the electronic art) and details of structurally and/or functionally similar structures can be found in electronic textbooks and/or patents, and it is believed that no purpose would be served in fully illustrating all such well known internal structural details of the elements shown in simplified block diagrammatic form in the figures of the accompanying drawings, since this would merely greatly increase the number of drawings and also the corresponding detailed description thereof without in any manner increasing the adequacy of the disclosure or increasing an understanding of the real inventive concept of the present invention, which lies primarily in the combinations and interrelationships of the various elements of the invention shown in said simplified block diagrammatic or schematic form in the figures of the drawings. The figures of the drawings are briefly described as follows:

FIG. 14 is a fragmentary view, in simplified block diagrammatic and schematic form, of a portion of the apparatus of FIG. 2 (although it is equally applicable to the apparatus of FIG. 9 or the apparatus of FIG. 10) wherein means are provided for effectively coupling the unsafe distance sensing portion of the apparatus (various forms of which are illustrated in FIGS. 2, 9, and 10 and in the subcombinations thereof) with respect to the vehicle steering system (whether of the mechanical type or of the powered type, such as hydraulic or pneumatic or otherwise powered servomotor means controlled by the driver of the vehicle and, in turn, controlling the steering apparatus of the vehicle) so that the forwardly projected and reflected unsafe distance sensing radiation will be effectively turned from a straight forward line with respect to the trailing carrier vehicle for appropriate impingement upon a forwardly spaced leading vehicle when both vehicles are driving along a roadway having a long smooth curve therein. In other words, this illustrates one type of arrangement for causing the apparatus to operate effectively even when the roadway between the leading vehicle and the trailing carrier vehicle is somewhat curved.

Figures 1, 2, 13, 14:
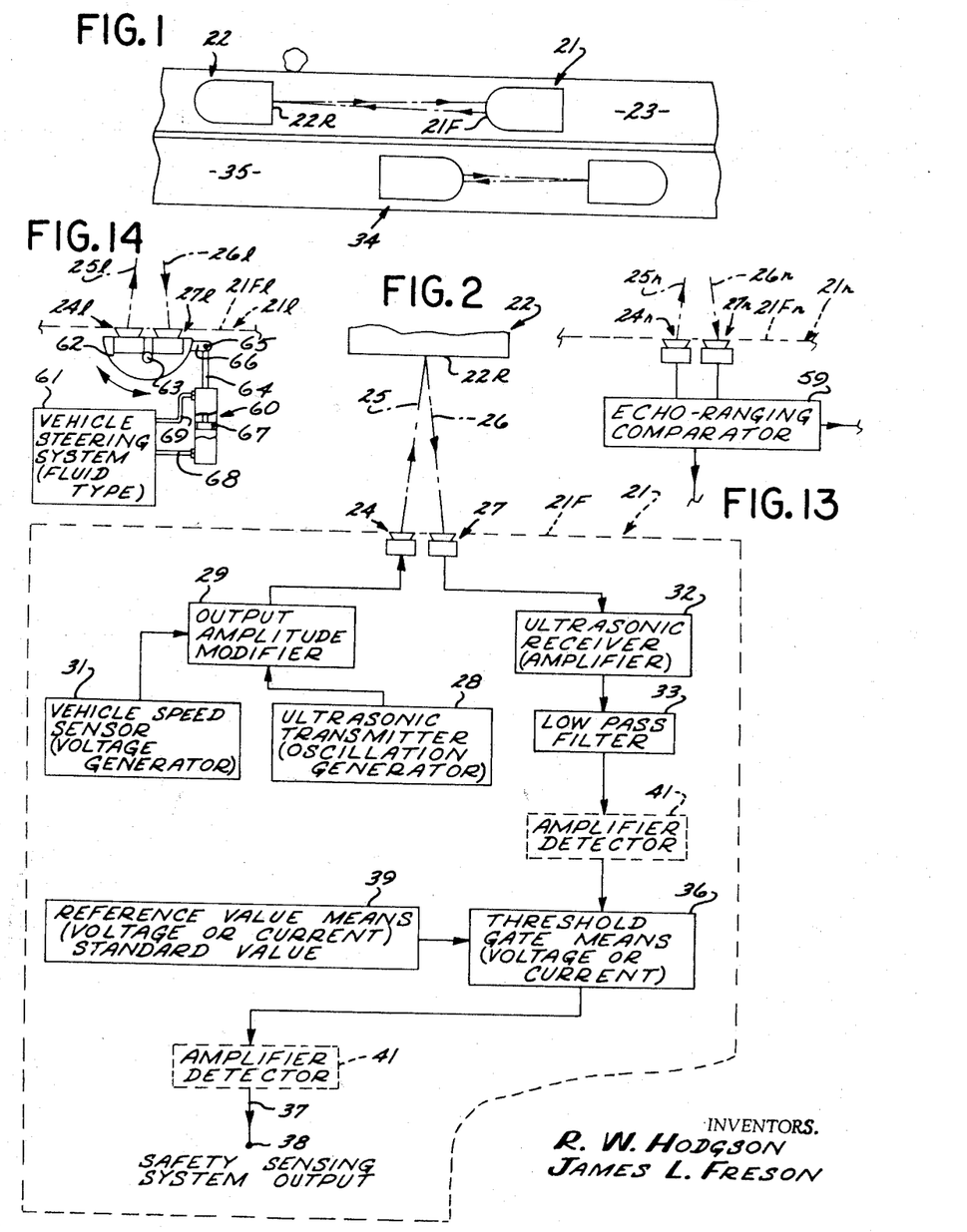
FIG. 1 is a simplified plan view diagrammatically illustrating two exemplary installations of the apparatus or system of the present invention in two laterally offset oppositely traveling trailing carrier vehicles and illustrating the operation of each individual system under typical traffic conditions.
FIG. 2 is a simplified diagrammatic and/or schematic view illustrating the safe or unsafe vehicle distance sensing portion of the apparatus of one exemplary form of the present invention adapted to be carried by a trailing carrier vehicle and shows an output circuit portion having an output terminal which is adapted to be connected to any of the driver warning portions of the apparatus of the present invention shown in FIGS. 3, 4, and 5, and/or to any of the speed control means shown in FIGS. 6, 7, and 8 of the corresponding exemplary forms of the invention.
FIG. 13 is a fragmentary view illustrating a slight modification of a portion of the apparatus of FIG. 2 (although it is also applicable to the apparatus of FIG. 9 and FIG. 10) wherein the apparatus is of an echo-ranging type including an echo-ranging comparator.

Generally speaking, the safe trailing distance maintenance apparatus and system of the present invention is adapted to be carried by a trailing carrier vehicle, such as one of those generally designated at 21 in FIG. 1, and is adapted to effectively measure the forward distance or space between the front end 21F of said trailing carrier vehicle 21 and the rear end 22R of a corresponding leading vehicle, such as one of those indicated generally at 22 in FIG. 1, when they are both driving in the same direction along a roadway 23. The measuring operation just described is adapted to be correlated with the forward speed of travel of the trailing carrier vehicle 21 in a manner such that a safe distance will be maintained between the trailing carrier vehicle 21 and the leading vehicle 22 at all times—said safe distance being that which has been determined in advance and built into the apparatus or effectively incorporated thereinto by subsequent adjustment and which will allow the driver of the trailing carrier vehicle 21 to stop without striking the rear end of the leading vehicle 22 in the event that said leading vehicle 22 should suddenly slow down or abruptly stop.

Figures 2A, 2C:
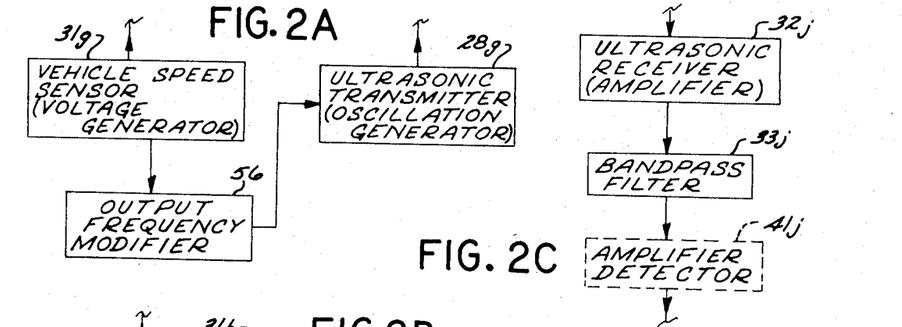
FIG. 2A is a simplified fragmentary block diagrammatic and schematic view illustrating one exemplary modification of a portion of the apparatus illustrated in FIG. 2.
FIG. 2C is a further simplified fragmentary block diagramamtic and schematic view illustrating another exemplary modification of a portion of the apparatus illustrated in FIG. 2.
Figure 2B:
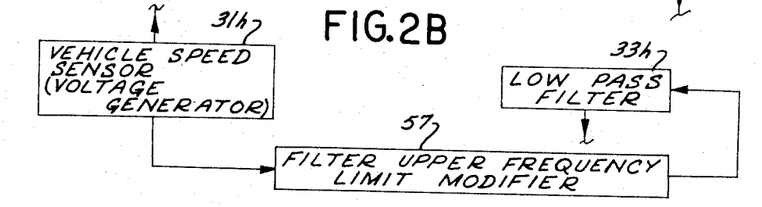
FIG. 2B is another simplified fragmentary block diagrammatic and schematic view illustrating another exemplary modification of a portion of the apparatus illustrated in FIG. 2.

The first exemplary form of the apparatus for accomplishing the above purposes carried by the trailing carrier vehicle 21 may be said to comprise a vehicle unsafe distance sensing portion, one exemplary version of which is illustrated in simplified diagrammatic and schematic form in FIG. 2. with various alternates being illustrated fragmentarily in FIGS. 2A, 2B, and 2C. Another alternate form of said sensing portion of the apparatus is illustrated in simplified diagrammatic and schematic form in FIG. 9, with various alternates thereof being fragmentarily illustrated in FIGS. 9A and 9B, and a third form of said sensing apparatus is illustrated in FIG. 10 in simplified diagrammatic and schematic form. Said sensing portion of the apparatus of the present invention, as illustrated in FIG. 2, will now be described as follows.

The sensing apparatus of FIG. 2 includes a transmitting part and a receiving part, with said transmitting part including a transmitting or output transducer means, such as is generally designated at 24, which is adapted to be mounted at the front end of the trailing carrier vehicle 21 in a forwardly facing direction and which is preferably of a high directionally selective type, such as is well known in the art, adapted to produce and radiate within the limits of a very narrow horizontal angle radiation or radiant energy such as is diagrammatically illustrated by a central portion or effective ray thereof, designated by the reference numeral 25, and which is adapted to come into contact with the rear end 22R of the leading vehicle 22 and then to be effectively reflected so as to provide a return or reflected portion of said radiation or radiant energy, the center line or effective central ray of which is diagrammatically shown in broken lines at 26, so that said return radiation 26 can be and will be directly received by a receiving or input transducer means, such as is generally designated at 27 in FIG. 2, and which provides an input to a receiving portion of the apparatus illustrated in FIG. 2.

In the exemplary form of the invention illustrated in FIG. 2, said transmitting portion of the apparatus includes, in addition to the output transducer means 24, oscillation generator and/or transmitter means, illustrated in block diagrammatic form at 28, and effectively connected to said output transducer means 24 through an output amplitude modifier or modifying means, illustrated in block diagrammatic form at 29 (the function and purpose of which will be explained hereinafter), whereby to effectively apply oscillatory electrical energy to the output transducer means 24 for energizing same and causing same to produce and forwardly radiate the output radiation or radiant energy indicated diagrammatically at 25.

Additionally, the transmitting portion of the apparatus illustrated in FIG. 2 includes vehicle speed sensor or sensing means, illustrated in block diagrammatic form at 31, and effectively and controllably connected with respect to the previously mentioned output amplitude modifier or modifying means 29 for modifying the amplitude of the oscillatory electrical signal applied by the oscillation generator means 28 through said output transducer means 24 in a manner which is a desired direct function of vehicle speed of the trailing carrier vehicle 21. In other words, the arrangement is such that the extent of the modification of said signal fed to the output transducer means 24, and, correspondingly, the amplitude of the output radiation 25, varies in accordance with the speed of forward travel of the trailing carrier 21 so as to be an effective measure of, and to correspond to, a predetermined minimum safe trailing distance for the trailing carrier vehicle 21 to be spaced behind the rear end of the leading vehicle 22 at any particular speed of travel of the trailing carrier vehicle 21.

The above-mentioned signal modification may be a linear function of the speed of forward travel of the trailing carrier vehicle 21 or may be a non-linear or power function thereof, depending upon what rule for safe vehicle spacing at various motor speeds is to be employed as the governing factor. In the event that a linear type rule is employed, which indicates that when the speed of forward travel of the trailing carrier vehicle 21 is doubled, the minimum safe distance between it and the leading vehicle 21 should also be doubled, then the output of the vehicle speed sensor or sensing means 31 and/or the extent of signal modification produced by the output amplitude modifier or modifying means 29 will correspondingly be such as to double the amplitude of the signal fed into the output transducer means 24 so that the output radiation 25 will be of twice the amplitude. On the other hand, in the event that a rule is used which implies that as the speed of the trailing carrier vehicle 21 is doubled, the minimum safe spacing distance between the trailing carrier vehicle 21 and the leading vehicle 22 should be the square of 2, which equals 4 (in other words, the governing rule comprising a square law function), the output of the vehicle speed sensor or sensing means 31 and/or the extent of signal modification provided by the output amplitude modifier or modifying means 29 will correspondingly be such as to follow such a square law function and, in the example illustrated, will, of course, effectively amplify the signal to the output transducer means 24 by a factor of 4 so that the output radiation 25 will similarly be multiplied in amplitude by a factor of 4.

It should be noted that in one exemplary form of the version of the invention illustrated in FIG. 2, the output radiation 25 may be acoustic radiation, preferably of an ultrasonic frequency such as approximately 35 kilocycles per second or the like, although not specifically so limited. Therefore, in such an exemplary version of the invention, the oscillation generator 28 may be any suitable type of electronic oscillation generator means such as are well known in the art and adapted to produce an electrical oscillatory signal which may be said to comprise a carrier wave signal of a frequency such as 35 kilocycles, for example, although not specifically so limited. Similarly, in such an exemplary form of the invention, the output transducer means 24 may comprise an electro-acoustic transducer means of any of a number of conventional and well-known types involving electrostrictive, magnetostrictive, and/or various forms of piezoelectric elements such as barium titanate or the like, although not specifically so limited, as the vibrating element adapted to convert the oscillatory electrical signal into corresponding mechanical or physical vibrations which may be coupled by suitable coupling means to ambient atmosphere for corresponding push-pull vibration whereby to produce the desired alternate compression and rarefaction waves or pulses in said ambient atmosphere which, of course, comprise such ultrasonic acoustic radiation as that exemplified at 25.

However, it should be noted that, in certain forms of the invention, various other types of output radiation in the electromagnetic frequency spectrum may be employed in lieu of the acoustic output radiation just described and, in such cases, of course, the output transducer means 24 will be correspondingly modified as will the oscillation generator means 28 in order to produce the desired frequency of electrical oscillations and output radiation.

Incidentally, it should be noted that the oscillatory electrical signal produced by the oscillation generator means 28 may effectively comprise what might be termed a carrier wave, as referred to hereinbefore, either modulated or unmodulated and in the event that it is to comprise a modulated carrier wave, suitable modulation means for appropriately modulating same may be provided and may effectively comprise a part of and be coupled with respect to said oscillation generator means 28.

Also, in the exemplary form illustrated in FIG. 2, the output amplitude modifier or modifying means 29 may comprise effective amplifier means embodying one or more non-linear electronic amplifier means, such as conventional vacuum tubes, transistors, or the like, which are capable of being biased for effectively controlling the amplitude of the signal passing therethrough. In such case, the bias terminal comprising the grid of such a vacuum tube amplifier, or the base of such a transistor, or other similar functionally equivalent control element, may be connected to the output from the vehicle speed sensor or sensing means 31, which may be an electrical output such as voltage or the like of a polarity such with respect to such a control element of the amplitude modifier or modifying means 29 as to alter the effective bias thereon in a direction such as to correspondingly increase the effective current flow therethrough from the oscillation generator means 28 to the output transducer means 24. In such case, the vehicle speed sensor or sensing means 31 may comprise what might be termed, in effect, a generator means adapted to produce an output voltage or current which is a function of the speed of forward movement of the trailing carrier vehicle 21. This might be accomplished by coupling a rotary element (such as the rotary input shaft of a voltage generator, current generator, or the like, comprising the vehicle speed sensor or sensing means 31 to some rotating part of the engine, speedometer shaft, to a tachometer shaft, transmission or wheels of the trailing carrier vehicle 21. On the other hand, the rotor of the distributor, comprising a part of the conventional ignition system of the trailing carrier vehicle 21, may also be effectively employed in operating a voltage generating output device (effectively comprising the means 31) for producing an electrical output for biasing the control element of such a vacuum tube or transistor of the output amplitude modified or modifying means 29.

However, the output amplitude modifier or modifying means need not necessarily be an amplifier having a vacuum tube amplifier means or a transistor amplifier or the like as referred to above, but may be any other type of amplifier means, such as a magnetic amplifier means, a ferro-electric amplifier means, various types of amplifier means embodying semi-conductor devices or, in fact, any type of amplifier means functionally operable in the general manner referred to above and for the purposes outlined above. Additionally, it may merely comprise a current-modifying means rather than an amplifier means, such as a variable impedance or variable resistance, with the variability thereof being under the control of the vehicle speed sensor or sensing means 31 and arranged to operate in the appropriate direction so that increased vehicle speed of the trailing carrier vehicle 21 will effectively reduce the impedance of resistance of the output amplitude modifier or modifying means 29 whereby to correspondingly increase the amplitude of the oscillatory electrical signal passed therethrough from the oscillation generation 28 to the output transducer 24. In such case, the effectively variable impedance or effectively variable resistance device comprising the output amplitude modifier or modifying means 29 may comprise what is known in the art as a controlled rectifier means (or a pair of them arranged to pass opposite portions of an oscillatory signal) effectively under the control of a control element thereof coupled to the vehicle speed sensor or sensing means 31, or a controllably variable impedance type of saturable reactor; or other magnetically controlled type transformer means may be employed, or a voltage or current responsive variable capacitance means may be employed for varying the capacitive reactance thereof in response to the electrical signal from the vehicle speed sensor or sensing means 31. A variable reactance type electron tube device of the type employed in reactance modulators in the frequency modulation art may also be employed as may a variable rheostat, which may be either electrically controlled by the vehicle speed sensor or sensing means 31 or directly physically connected to a physical control element, such as variable-position mechanical structures of the type frequently found in rotary motor speed control governor means which may directly move a slider or other control tap of such a variable rheostat. None of these variations of the output amplitude modifier 29 is illustrated in detail since such would unnecessarily increase the number of drawings of the present application and correspondingly unnecessarily increase the descriptive portion of the specification and further since such arrangements are well known in the art.

The previously mentioned receiving portion of the apparatus illustrated in FIG. 2, in addition to the receiving or input transducer means 27, usually includes what might be termed a receiver means, such as indicated diagrammatically at 32, which normally comprises an amplifier means, and additionally includes a frequency-sensitive circuit means, such as the low pass filter means diagrammatically indicated at 33, which is operable to effectively discriminate against the return oscillatory electrical signal means produced by the receiving input transducer means 27 and passed through the receiver and amplifier means 32 to the low pass filter means 33 and which may be said to have been effectively shifted by Doppler effect to a frequency in excess of a predetermined upper frequency which is above the frequency of the output radiation 25 by a predetermined upper frequency margin. This may be clarified by consideration of the fact that the frequency of the output radiation 25 and the frequency of the reflected or return radiation 26 will normally be substantially the same in the event that the speeds of the leading vehicle 22 and the trailing carrier vehicle 21 are the same. However, in the event that the speed of the trailing carrier vehicle 21 is in excess of the leading vehicle 22, the frequencies of the reflected or return radiation 26 will be higher than the frequencies of the output radiation 25—this upward shift of the frequency of the reflected and return radiation 26 being accomplished by the well-known Doppler effect. Conversely, if the speed of the trailing carrier vehicle 21 is less than the leading vehicle 22, the frequency of the return or reflected radiation 26 will be less than that of the output radiation 25—this downward shift of the frequency of the reflected and return radiation 26 being accomplished by the same well-known Doppler effect. Therefore, it is apparent that said low pass filter means 33 should normally be set to pass frequencies below a predetermined extent of frequency elevation or a frequency increment above the output frequency 25 by an amount which might be expected when the trailing carrier vehicle 21 is traveling at the maximum speed with which it would ever be expected to travel and is approaching the leading vehicle which is proceeding at the very slowest speed with which it would ever be expected to travel, which would be barely moving or even completely stopped. Under such conditions, it will be found that the frequency of the reflected or return radiation 26 will be substantially higher than the frequency of the output radiation 25 by said predetermined upper frequency margin referred to above, and this maximum expected frequency of the reflected or return radiation 26 should be the upper cut-off frequency of the low pass filter means 33 so that the apparatus will be operative for sensing and reporting the too close approach of the trailing carrier vehicle 21 to a leading vehicle 22, irrespective of the speed of the trailing carrier vehicle 21 and irrespective of the speed of the leading vehicle 22. However, no higher frequency is required to be passed by the low pass filter means 33 and, indeed, its cut-off characteristic at this upper frequency limit is important since it will have the effect of excluding similar signals received from the output transducers of similarly equipped third vehicles traveling in the opposite direction toward the front end 21F of the trailing carrier vehicle 21 and usually in laterally displaced adjacent lanes of a freeway or other roadway such as is clearly illustrated in FIG. 1 at 34 where such an oppositely traveling vehicle equipped with apparatus of the present invention is shown in a roadway 35 laterally adjacent to the first-mentioned roadway 23. Thus, the upper frequency cut-off characteristic of the low pass filter means 33 prevents the reception by the receiving and input transducer means 27 of such output radiation from vehicles traveling in the opposite direction.

The low pass filter means 33 is connected to threshold gate means, such as is diagrammatically indicated at 36, which may comprise any suitable type of threshold gate means adapted to effectively pass the output from the low pass filter means 33 to an output circuit 37 and an output terminal 38 thereof whenever said signal from the low pass filter means 33 has a maximum voltage (or current) value in excess of a predetermined reference value which corresponds in effect to the physical transition of the space between the trailing carrier vehicle 21 and the leading vehicle 22 from a safe distance to an unsafe distance. It will be noted that the threshold gate means 36 has effectively coupled thereto a reference value means indicated diagrammatically at 39 and which may be any type of means adapted to provide a reference or standard value to the threshold gate means 36 below which value said threshold gate means 36 is effectively inoperative and/or open, and above which valve said threshold gate means 36 is operative and is effectively closed, so as to produce an output signal in the output circuit 37 and at the output terminal 28 thereof, which comprises a signal indicating that an unsafe or too short spacing between the trailing carrier vehicle 21 and the leading vehicle 22 exists.

It should be noted that the threshold gate means 36 may be any numerous well-known types of threshold gate means, many of which employ non-linear amplifier elements such as vacuum tube means with control grids, semiconductor amplifiers with control elements, such as bases thereof, or various other non-linear effective amplifier or variable impedance or variable resistor means in many ways similar to certain of those referred to hereinbefore in connection with various alternative forms of the previously described amplitude modifier or modifying means 29. Also, the reference value means 39 may be of any of a variety of different types such as reference batteries having a very constant output voltage value or such a reference voltage (or current) source provided with variable resistance or impedance means for modifying and adjusting the reference value of the output voltage therefrom, or any other of various well-known standard types of reference value means which may be effectively coupled with respect to the threshold gate means 36. Indeed, in certain cases, the reference means 39 may merely comprise a circuit element connected with respect to the threshold gate means 36 and adapted to be either electrically or mechanically modified so as to correspondingly modify the gating point (with respect to voltage or current) above which the threshold gate means 36 is effectively operative and closed and below which said threshold gate means 36 is effectively inoperative and open with respect to the output circuit means or portion 37 or the output terminal 38 thereof. Since such variable types of threshold gate means and/or reference value means are well known in the art, they are not illustrated in detail in the drawings of the present application since this would unnecessarily increase the number of drawings and would further unnecessarily increase the length of the specification in order to describe the detailed structures thereof, and since such detailing thereof would in no way touch upon the real inventive concept of the present invention.

Incidentally, it should be noted that suitable detector means, such as is shown in broken lines at 41 in two different locations in FIG. 2, may be optionally positioned in one or other of said two locations, or elsewhere, if desired—particularly in the event that the original output of the oscillation generator means 28 was of a modulated carrier type.

Figure 3:
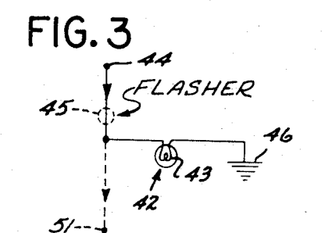
FIG. 3 is a fragmentary electrical schematic view illustrating one exemplary type of perceptible warning signal-producing means adapted to be coupled to the output terminal of the safe or unsafe vehicle distance sensing portion of the invention illustrated in FIG. 2, or the alternative form thereof illustrated in FIG. 9, and fragmentarily in FIG. 10, respectively.

FIG. 3 illustrates one exemplary type of visibly perceptible warning signal-producing means adapted to be connected to the output terminal 38 of the apparatus of FIG. 2 for electrical energization thereby whenever the output circuit means 37 of FIG. 2 is effectively closed by the threshold gate means 36 of FIG. 2 so that the warning signal producing means, indicated generally at 42 in FIG. 3, may be energized and will produce a perceptible warning signal so that a driver of the trailing vehicle 21 will be immediately warned that he is too close to the leading vehicle 22. In the exemplary arrangement illustrated in FIG. 3, the perceptible warning signal-producing means indicated generally at 42 comprises an electrically energizable lamp means 43, which may be of the small jeweled indicator type (usually red) and which may be adapted to be mounted on the instrument panel or dashboard or at some other convenient location within the trailing carrier vehicle 21 closely adjacent to and within the field of view of a driver thereof. In the example illustrated, the input terminal 44 of the fragmentary circuit portion is adapted to be connected to the output terminal 38 of FIG. 2 and may be connected through an intermittent flasher means (or circuit interrupter) such as is shown in phantom at 45 to the warning lamp 43 and then to ground as indicated at 46, although various other circuit arrangements and connections may be employed in lieu thereof. The optional provision of such a flasher means 45 will cause the jeweled warning lamp 43 to intermittently flash in a manner which can hardly fail to be seen by a driver of the trailing carrier vehicle 21. However, if it is not desired, the flasher means 45 may be eliminated.

Figure 4:
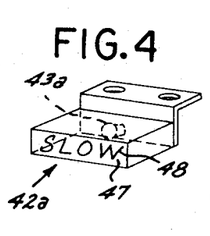
FIG. 4 is a three-dimensional view illustrating one exemplary form of the perceptible warning signal-producing means of FIG. 3.

FIG. 4 illustrates a slight variation of the form of the apparatus illustrated in FIG. 3, wherein the electrical connections may be the same as shown in FIG. 3 and, therefore, are not again shown, but wherein the lamp 43 of FIG. 3 is no longer a small jeweled warning light, but is a somewhat larger back-illumination light and, because of the slight difference thereof, is designated by the reference numeral 43a in FIG. 4. Said back-illumination light 43a is positioned behind a transparent or translucent panel 47 which bears in a visibly perceptible manner warning lettering, such as shown at 48, which in the example illustrated spell out the word, "SLOW," which presumably might be in red letters or the like, and which would provide a very definite and clear-cut warning to the driver of the trailing carrier vehicle 21 when the back-illumination light 43a becomes energized. This slight modification of the invention may also employ a flasher means, such as shown at 45 in FIG. 3, to further increase the efficacy of the warning signal, if desired.

Figure 5:
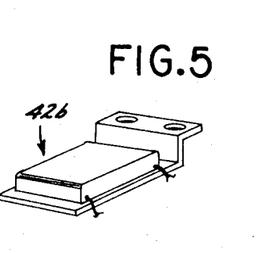
FIG. 5 is a view illustrating another form of the perceptible warning signal-producing means of FIG. 3 which may be employed in lieu thereof or in combination therewith.

FIG. 5 illustrates a further slight modification of the warning signal-producing means, indicated at 42 in FIG. 3 and, in this case, comprising a sound-producing buzzer means, indicated at 42b, and which is adapted to be electrically connected in exactly the same manner as the lamp 43 of FIG. 3 and either in lieu thereof or in addition thereto, and which will, of course, operate to produce a loud buzzing sound to warn the driver of the trailing carrier vehicle that he is too close to the leading vehicle 22.

Figure 6:
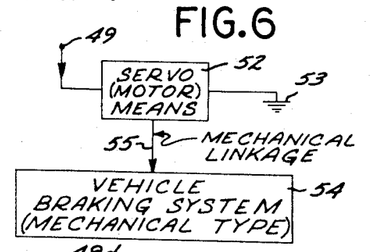
FIG. 6 is a fragmentary simplified view, in block diagrammatic and schematic form, illustrating one exemplary type of vehicle speed control means adapted to be coupled to the output terminal of the safe or unsafe vehicle distance sensing portion of the invention illustrated in FIG. 2 or the alternative forms thereof illustrated in FIG. 9, and fragmentarily in FIG. 10, respectively.

FIG. 6 illustrates a further modification of the invention which may be used as an alternate to the warning signal-producing means in FIGS. 3–5 or which may be used in conjunction therewith and in addition thereto and which may be said to effectively comprise vehicle speed control means carried by the trailing carrier vehicle 21 and adapted to effectively reduce the speed thereof whenever the output circuit means 37 of FIG. 2 is closed by the threshold gate means 36 of FIG. 2. In the form illustrated in FIG. 6, the terminal 49 is adapted to be electrically connected to either the output terminal 38 of FIG. 2 or to the phantom line output terminal 51 of FIG. 3 and is electrically connected to servomotor means, indicated diagrammatically at 52, the opposite end of which is grounded, as indicated at 53, with said servomotor means 52 being effectively operatively linked or coupled with respect to the vehicle braking system of the trailing carrier vehicle 21; said vehicle braking system being indicated diagrammatically at 54 in FIG. 6.

In the arrangement illustrated in FIG. 6, the effective linkage of the servomotor means 52 with respect to the vehicle braking system 54 is a mechanical type linkage, as indicated diagrammatically and schematically by the reference numeral 55, and implies that the servomotor means 52, which may be an electric motor means, an electrically controlled fluid or hydraulic motor means preferably operated off of the pressurized hydraulic system conventionally provided in many cars for operating power brakes, power steering, or the like (although not specifically so limited), is physically or mechanically connected with respect to the brake drums or shoes or other physically movable elements of the braking system at the wheels of the motor vehicle and is provided with controlling and limiting means to effectively gradually operate the braking system of the motor vehicle so as to slow it down a certain percentage, but not to lock the brakes thereof by excessive operation of said vehicle braking system. Such servomotor operated mechanical coupling arrangements are not shown in detail in the drawings since such arrangements are well within the skill of persons skilled in the art and comprise no part of the real inventive concept of the present invention and further since such detailed showings would greatly increase the number of drawings and, consequently, would greatly increase the length of the specification and would not add anything to the disclosure of the real inventive concept of the present invention, which lies in the interrelationships of the various elements of the system of the present invention.

Figure 7:
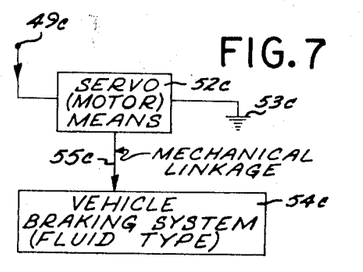
FIG. 7 is a view similar to FIG. 6, and also in fragmentary block diagrammatic and schematic form, and illustrates an alternative vehicle speed control means adapted to be similarly connected to the apparatus of FIG. 2, FIG. 9, or FIG. 10.

FIG. 7 is a view similar to FIG. 6 and illustrates an alternate arrangement, with similar parts being indicated by similar reference numerals, followed by the letter, "c," however. In this modification, it will be noted that the servomotor means 52c is functionally equivalent to that shown at 52 in FIG. 6, while the vehicle braking system 54c is also functionally equivalent to that shown at 54 in FIG. 6, although it is shown as being of a pneumatic or hydraulic type rather than the mechanical type of FIG. 6. The linkage or coupling indicated diagrammatically at 55c is functionally equivalent to that shown at 55 in FIG. 6. Therefore, in view of the great similarity of FIG. 7 to the previously described FIG. 6, no further detailed description thereof is set forth herein.

Figure 8:
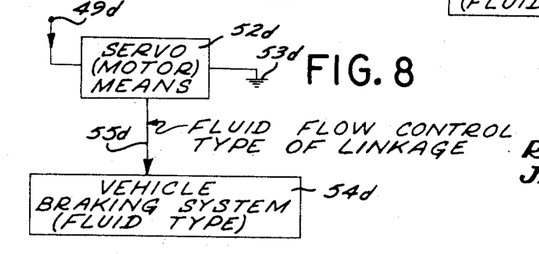
FIG. 8 is another view similar to FIGS. 6 and 7, and also in fragmentary block diagrammatic and schematic form, and illustrates another alternative vehicle speed control means adapted to be similarly connected to the apparatus of FIG. 2, FIG. 9, or FIG. 10.

FIG. 8 is a further alternative arrangement to that shown in FIGS. 6 and 7 and because of the similarity thereof, corresponding parts are indicated by similar reference numerals, followed by the letter, "d," however. In this modification, the major difference from the showing of FIG. 7 is the fact that the effective linkage or coupling indicated diagrammatically at 55d is shown as being of a fluid control type rather than a mechanical linkage and, in one exemplary form, would provide flow-controlling valve means effectively connected between a pressurized source of fluid (such as that conventionally available in automobiles having power steering or power braking systems, or provided by auxiliary fluid pressurizing means) and the connection thereof to either the pre-existing brake cylinders which conventionally operate the vehicle's brakes or to auxiliary brake cylinders of similar construction, so that opening said flow-controlling valve means of said effective linkage or coupling means 55d would progressively apply the brakes of the trailing carrier vehicle 21, and so that oppositely directed operation of said flow-controlling valve means would progressively release said brakes. The detailed structure of such an arrangement is not set forth in the drawings or specification with great particularity for precisely the same reasons as explained above in considerable detail.

Figure 9:
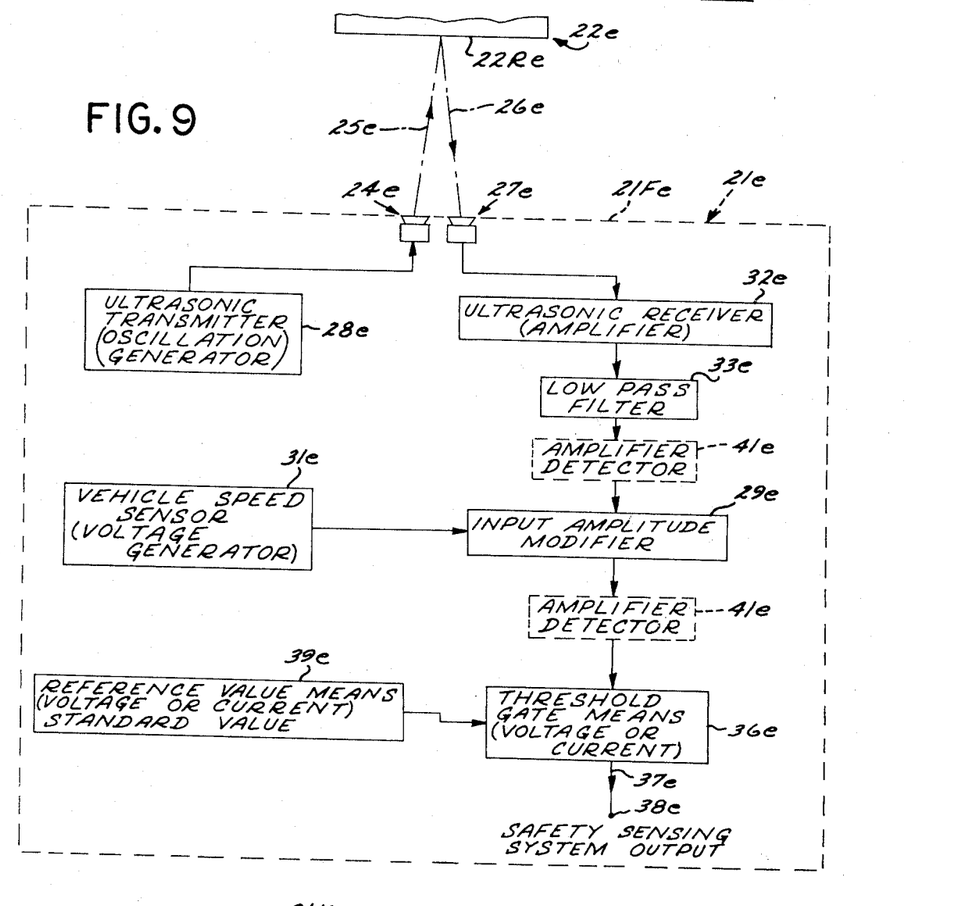
FIG. 9 is a simplified diagrammatic and/or schematic view generally similar to FIG. 2, but illustrates a slightly modified form of the invention wherein the amplitude modifier or modifying means is changed from an output amplitude modifier to an input amplitude modifier and is correspondingly moved from the transmitter circuit as shown in FIG. 2 to the receiver circuit as shown in FIG. 9.
Figures 10, 12:
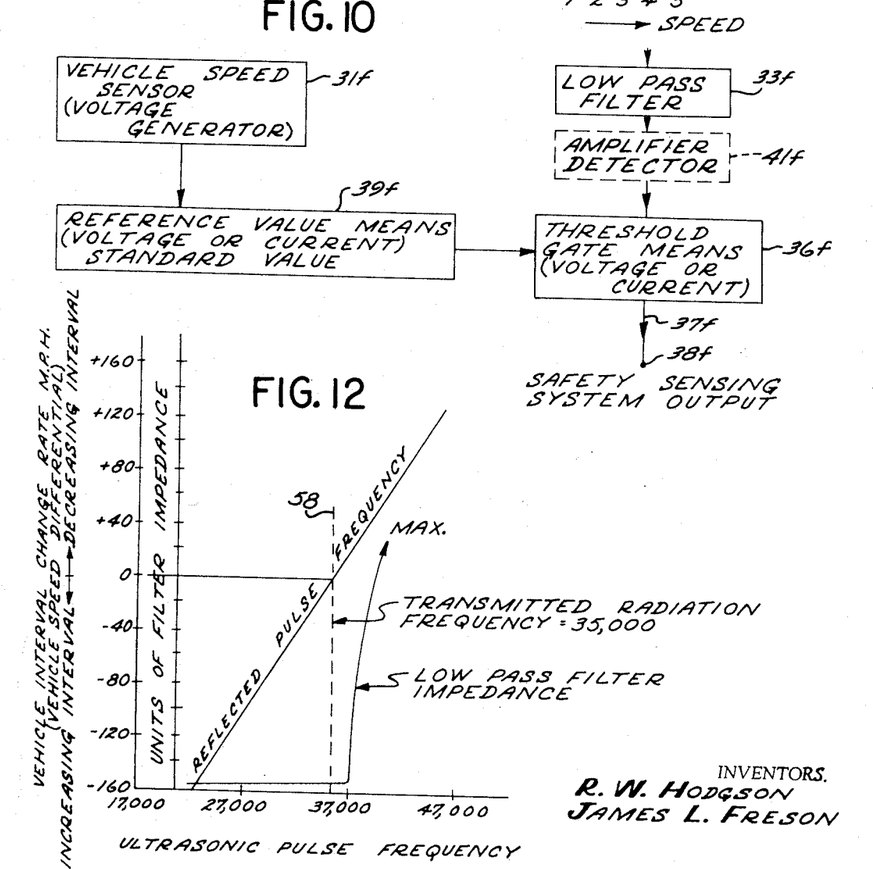
FIG. 10 is another simplified fragmentary diagrammatic and/or schematic view illustrating a slightly modified portion of the apparatus of FIG. 9 and effectively comprising therewith a modified form of the invention wherein the amplitude modifier or modifying means of the receiver circuit is eliminated entirely and the vehicle speed sensor or sensing means is instead controllingly coupled with respect to the threshold gate means by way of the reference value means.
FIG. 12 is a graph illustrating the operation of the low pass filter means in one form of the invention and also the band pass filter means in another form of the invention. Furthermore, it illustrates the relationships of said filter means with respect to the Doppler effect frequency shift of the return or reflected radiation under the most extreme expected condition of use when a trailing carrier vehicle has an absolutely maximum relatively forward speed in excess of a leading vehicle.

FIG. 9 is a view similar to FIG. 2, but illustrates a modified form of the unsafe distance sensing portion of the apparatus of the present invention, and because of the similarities to the form illustrated in FIG. 2 and previously described in great detail, similar reference numerals, followed by the letter, "e," however, designate corresponding parts of the apparatus illustrated in FIG. 9.

It will be noted that the major difference of the structure illustrated in FIG. 9 from that illustrated in FIG. 2 is the fact that the amplitude modifier or modifying means 29 of FIG. 2 is not present in FIG. 9 in the same positional relationship as shown in FIG. 2, but is present in a different positional relationship in FIG. 9 and effectively comprises what might be termed an input amplitude modifier or modifying means designated in block diagrammatic form at 29e. Said amplitude modifier means 29e, of course, operates in substantially the same manner as the amplitude modifier shown at 29 in FIG. 2 and has the effect of correspondingly modifying the amplitude of the signal fed to the threshold gate means 36e of FIG. 9 in a manner effectively equivalent to the end result produced by the operation of the amplitude modifier or modifying means 29 of FIG. 2. In other words, the output signal at the output terminal 38e of FIG. 9 is substantially the same as that at the output terminal 38 of FIG. 2 and operates for the same unsafe vehicle spacing indication and/or control purposes as that previously described in connection with the output signal available at the output terminal 38 of FIG. 2.

FIG. 10 is a fragmentary view similar to portions of FIGS. 2 and 9 and illustrates a further illustrative and exemplary modification of the unsafe distance sensing portion of the apparatus of the present invention and because of its similarity to the showings of FIGS. 2 and 9, similar parts are indicated by similar reference numerals, followed by the letter, "f," however. The major difference of the form of the invention illustrated in FIG. 10 from that illustrated in either FIG. 2 or FIG. 9 is the fact that it has no amplitude modifier means corresponding to 29 of FIG. 2 or 29e of FIG. 9, but, instead, has the vehicle speed sensor or sensing means 31f coupled effectively with respect to the threshold gate means 36f by way of the reference value means 39f for substantially the same output signal controlling purposes as described in connection with FIGS. 2 and 9. In other words, by controlling the bias or point of operation of the threshold gate means 36f in response to the output of the vehicle speed sensor or sensing means 31f (in the arrangement fragmentarily illustrated in FIG. 10 by correspondingly controlling the output of the reference value means 39f, which controls said bias or operating point of the threshold gate means 36f) the output signal in the output circuit 37f and available at the output terminal 38f will be substantially the same as that at the output terminal 38 of the form of the apparatus illustrated in FIG. 2 or the output signal at the output terminal 38e of the form of the invention illustrated in FIG. 9 and is only present when the unsafe distance sensing portion of the apparatus fragmentarily illustrated in FIG. 10 senses that the trailing carrier vehicle 21 has approached too closely for safety to the leading vehicle 22, taking into consideration the forward speed of travel of the trailing carrier vehicle 21.

It should be noted that, apart from the changes described above and illustrated fragmentarily in FIG. 10, the remainder of this modified form of the apparatus is similar to that shown more fully in FIG. 9, and the above description of the FIG. 10 modification of the invention should be clearly understood as describing only the changed portions of such a complete system, which does not in any way mean that the remainder of the system of FIG. 9, which is not described above in connection with the FIG. 10 modification thereof, is not present in the FIG. 10 modification thereof, when actually it is, and for a description of the remainder of the FIG. 10 modification of the invention, the interrelationship of the various parts thereof, and the operations thereof, reference is made to the full showing of FIG. 9 and the full description thereof set forth hereinbefore.

FIG. 2A illustrates, in fragmentary, simplified, block diagrammatic form, a slight modification of a portion of the unsafe distance sensing apparatus of FIG. 2 and, because of the similarity thereof to the form of the invention illustrated in FIG. 2, similar reference numerals, followed by the letter, "g," however, designate corresponding parts. In this modification of a portion of the invention, the vehicle speed sensor or sensing means 31g is additionally coupled in controlling relationship with respect to an output frequency modifier or modifying means, which is generally designated by the reference numeral 56, and which in turn is coupled to the oscillation generator 28g in a manner such as to modify the frequency of the oscillatory electrical signal produced by said oscillation generator 28g as a desired function of the speed of forward travel of the trailing carrier vehicle 21. The frequency modification in the arrangement illustrated in FIG. 2A is inversely related to the forward speed of travel of the trailing carrier vehicle 21 so that the frequency of the oscillatory electrical signal produced by the oscillation generator 28g will be effectively reduced as the forward speed of travel of the trailing carrier vehicle 21 increases so that the radiation reflected from the rear end 22R of the leading vehicle 22, and similar to that shown at 26 in FIG. 2, including the increased frequency thereof, or the upward shift thereof, produced as a result of Doppler effect, in the manner previously referred to, under the most extreme conditions of such upward shift, comprising maximum speed of travel of the trailing carrier vehicle 21 and minimum speed of travel of the leading vehicle 22, will be such as to be capable of being effectively passed, when in the form of the return oscillatory electrical signal, from a receiving or input transducer, such as that shown at 27 in FIG. 2, by a low pass filter means, similar to that shown at 33 in FIG. 2, but which, in the modification of the invention illustrated in FIG. 2A, will normally be set at substantially the *normal* frequency of the electrical oscillatory signal produced by the oscillation generator means 28g when the trailing carrier vehicle 21 is traveling at very low speed or is substantially stopped. In other words, in the form of the invention illustrated in FIG. 2, the low pass filter means 33 had its upper cut-off frequency point set substantially above the output frequency of the oscillation generator means 28 in order to allow for such upward Doppler shift, while in the modified form of the invention illustrated fragmentarily in FIG. 2A, the modified low pass filter means (of a type similar to that shown at 33 in FIG. 2) does not have its upper cut-off frequency limit so elevated, but has it set at the normal frequency of output of the oscillation generator means 28g but said output of said oscillation generator 28g is arranged to be reduced in frequency by the output frequency modifier means 56 as the speed of travel of the trailing carrier vehicle 21 increases, thus producing substantially the same end result with respect to the conditions of highway travel referred to above when the extreme maximum upward Doppler effect frequency shift will occur.

It should be noted that the output frequency modifier illustrated in block diagrammatic form at 56 in FIG. 2A may take any of a number of different forms well known in the art, such as a reactance modulator of the type conventionally used in the frequency modulation art, or any of a variety of other well-known frequency modifying arrangements and, therefore, the interior structural detail thereof is not specifically illustrated in the drawings nor is it specifically described in the specification, since such would merely unnecessarily increase the length thereof and would not touch upon the real inventive concept of the present invention.

FIG. 2B illustrates a further slight modification of a portion of the form of the invention illustrated in FIG. 2 and, because of the similarity thereof to that illustrated in FIG. 2, similar parts are indicated by similar reference numerals, followed by the letter, "h," however. It will be found that in this modification, the major difference from the form of the invention illustrated in FIG. 2 is the provision of a filter limit modifier or modifying means, indicated in block diagrammatic form at 57, which is effectively coupled between the vehicle speed sensor or sensing means 31h and the low pass filter means 33h and which is adapted to effectively modify the upper cut-off frequency limit or value of the low pass filter means 33h as a direct function of the forward speed of travel of the trailing carrier vehicle 21 so that said low pass filter means 33h will be capable of receiving and passing a return oscillatory electrical signal in the return or receiving portion of the apparatus and corresponding to return or reflected radiation similar to that shown at 26 in FIG. 2, which has had its frequency shifted or raised as a result of Doppler effect to the maximum extent to be expected under the extreme conditions of highway travel referred to hereinbefore, wherein the trailing carrier vehicle 21 is traveling at a maximum speed, and the leading vehicle 22 is traveling at a minimum speed. In other words, the arrangement illustrated in FIG. 2B is an alternate to the arrangement illustrated in FIG. 2A and just described above.

It should be noted that the filter upper frequency limit modifier or modifying means 57, and its cooperation with the low pass filter means 33h, may take any of a number of different forms well known in the art, such as any suitable type of variable inductance or reactance means, or any suitable type of variable capacitance means, or both, since the cut-off frequency of a low pass filter can be modified by varying capacitive elements therein and/or varying inductance elements therein or both. Such variable inductance elements may comprise biasable saturable reactor means and/or controlled magnetic amplifier means, variable reactance electron tube means of the type conventionally used in reactance modulators in the frequency modulation art, voltage and/or current sensitive variable capacitance means as are also well known in the art, and/or various other functionally equivalent arrangements, and, therefore, the interior structural detail thereof is not specifically illustrated in the drawings nor is specifically described in the specification since such would merely unnecessarily increase the length thereof and would not touch upon the real inventive concept of the present invention.

FIG. 2C is a further simplified fragmentary view, in block diagrammatic form, illustrating a further slight modification of a portion of FIG. 2 and, because of the similarity thereof to the showing of FIG. 2, similar parts are indicated by similar reference numerals, followed by the letter, "j," however. This modification is very similar to the showing of original FIG. 2 with respect to the low pass filter 33 thereof, except that the corresponding filter indicated at 33j in FIG. 2C has a low cut-off frequency limit in addition to an upper cut-off frequency limit and, therefore, may be said to actually comprise a bandpass filter means 33j, which has its upper frequency cut-off limit, when used in apparatus of the FIG. 2 type, set at the same upper cut-off frequency limit as the low pass filter 33 of FIG. 2, but which has its lower frequency cut-off point very slightly below the frequency produced by the oscillation generator 28 of FIG. 2 so that frequencies substantially below said frequency will not be passed by the bandpass filter means 33j. This means, in effect, that whenever the distance between the trailing carrier vehicle 21 and the leading vehicle 22 is increasing because the leading vehicle 22 is moving forwardly at a relatively faster speed than the trailing carrier vehicle 21, the reflected or return radiation, such as that shown at 26 in FIG. 2, will be shifted downwardy in frequency by Dopper effect and the corresponding return oscillatory electrical signal will not be passed by the bandpass filter means 33j of the modified form of the invention illustrated fragmentarily in FIG. 2C. This is desirable, since under such conditions of highway travel, there is little or no likelihood of the trailing carrier vehicle 21 striking the leading vehicle 22. When the bandpass filter means 33j is employed in a system of the type illustrated fragmentarily in FIG. 2B, its upper frequency cut-off limit will normally be set at the same value as that of the low pass filter means 33h of FIG. 2B and its low frequency cut-off limit may be set at a lower frequency value spaced therebelow and adapted to also be modified by the frequency limit modifier means 57 of FIG. 2B upwardly to substantially the same extent as the upward modification of the upper cut-off frequency by said frequency limit modifier 57 in response to increasing speed of the trailing carrier vehicle 21.

Figure 9A:
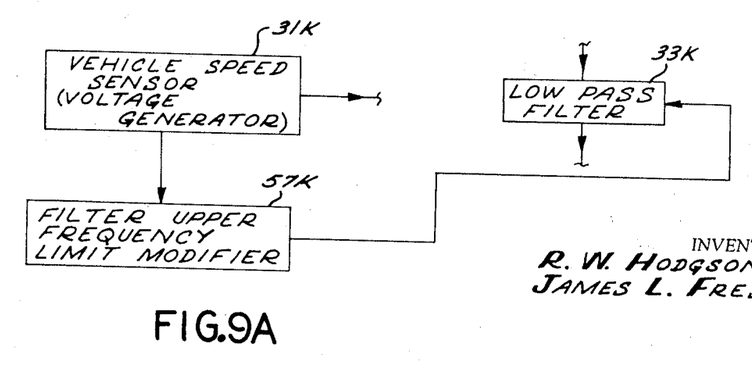
FIG. 9A is a simplified fragmentary block diagrammatic and schematic view illustrating one exemplary modification of a portion of the apparatus illustrated in FIG. 9.

FIG. 9A is a simplified fragmentary view, in block diagrammatic form, illustrating a modification of a portion of the apparatus illustrated in FIG. 9 and, because of the similarity thereof to the showing of FIG. 9, similar reference numerals, followed by the letter, "k," however, designate similar parts. In this modification, the major difference from the form of the invention illustrated in FIG. 9 is the additional provision of a filter upper frequency limit modifier 57k, similar to that illustrated at 57 in FIG. 2B and similarly connected between the vehicle speed sensor or sensing means 31k and the low pass filter means 33k and adapted to operate in substantially the same manner and for substantially the same purposes as that described in detail hereinbefore in connection with the description of FIG. 2B. Therefore, no further discussion of the modification of FIG. 9 illustrated in FIG. 9A is thought necessary or desirable.

Figure 9B:
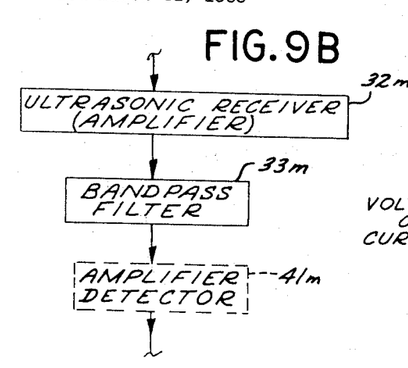
FIG. 9B is another simplified fragmentary block diagrammatic and schematic view illustrating another exemplary modification of a portion of the apparatus illustrated in FIG. 9.

FIG. 9B is another simplified fragmentary view, in block diagrammatic form, illustrating a further modification of the form of the invention illustrated in FIG. 9, which is substantially identical to the modification of the FIG. 2 form of the invention illustrated fragmentarily in FIG. 2C, and because of the similarity to the showing of FIG. 9, similar parts are indicated by similar reference numerals, followed by the letter, "m," however. The modification shown in FIG. 9B comprises a bandpass filter means 33m which is similar in all respects to the bandpass filter means 33j illustrated in FIG. 2C, and it is connected, with respect to the remainder of the apparatus of FIG. 9, in a manner similar to the low pass filter means 33e of FIG. 9. In view of the full description hereinbefore of the bandpass filter means 33j of FIG. 2C, no additional description of the similar bandpass filter means 33m shown in FIG. 9B is thought necessary or desirable.

It should be noted that FIG. 9 may also be modified in a manner similar to the modification of the FIG. 2 form of the invention illustrated in fragmentary diagrammatic and schematic form in FIG. 2A. In other words, the vehicle speed sensor or sensing means 31e of FIG. 9 may be provided with an output frequency modifier similar to that shown at 57 in FIG. 2A and adapted to be similarly connected with respect to the ultrasonic transmitter or oscillation generator 28e of the FIG. 9 version of the invention for controlling the frequency of the oscillatory output electrical signal produced by the oscillation generator 28e of the FIG. 9 version of the invention in substantially the same manner as that described hereinbefore in connection with the FIG. 2A modification of the FIG. 2 form of the invention and for the same purposes. It is not believed necessary to specifically illustrate this modification of the FIG. 9 form of the invention, since such a fragmentary figure would be identical to that shown already in FIG. 2A.

Incidentally, in connection with the two unsafe vehicle distance sensing portions of the present invention illustrated in FIGS. 2 and 9, it should be noted that the various various modifications thereof illustrated in FIGS. 2A, 2B, 2C, 9A, and 10, and in the modification of the FIG. 9 form of the invention similar to that shown in FIG. 2A just described above, that various combinations of the various subelements and modified subelement portions of said two forms illustrated in FIGS. 2 and 9 are all intended to be included and comprehended in the present invention, although all such combinations and permutations are not individually illustrated in each case by an individual complete block diagrammatic and schematic drawing since, obviously, this would require a very greater number of such drawings and would not basically add to the adequacy of the disclosure of the present invention already provided by the previously described drawings of the present invention taken in conjunction with the detailed descriptions thereof set forth herein.

Figure 11:
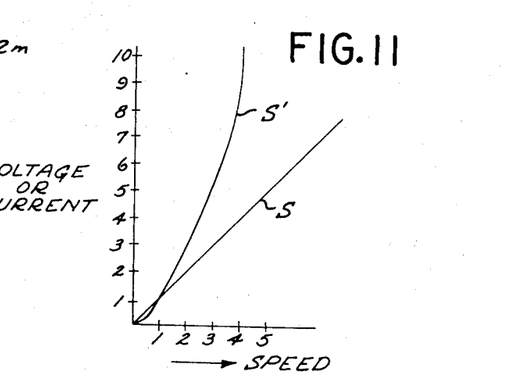
FIG. 11 is a view showing a graph illustrating a few of the possible types of output signals produced by the vehicle speed sensor or sensing means for use in controlling the unsafe distance sensing apparatus of the invention.

FIG. 11 illustrates several different types of voltage (or current) outputs from the vehicle speed sensor or sensing means, such as the exemplary one shown at 31 in FIG. 2, or the corresponding similar ones shown in various of the other figures, and illustrates primarily different types of functions of the output thereof with respect to forward vehicle speed of the trailing carrier vehicle 21. For example, the output signal S thereof is a direct linear function type of output signal which varies directly with the vehicle speed and may be employed where this is believed to provide adequate spacing between the trailing carrier vehicle 21 and the leading vehicle 22 at the various speeds involved. Actually, the other output signal curve S' corresponds more closely to the current thinking of traffic safety engineers since it is a non-linear or power curve, such as a square law curve for example, which provides a different type of safe spacing between leading and trailing vehicles at very high speeds from the output signal S and greatly in excess thereof at high speeds. Of course, various other types of functions, whether simple or complex, may be employed in lieu of those shown in FIG. 11, which are merely for illustrative purposes.

FIG. 12 illustrates the operation of the low pass filter means, such as the exemplary one illustrated at 33 in FIG. 2, and similar ones illustrated in various of the other figures of the drawings also. It will be noted that the low pass filter means 33 has an extremely low impedance from, say, approximately 20,000 cycles per second to approximately 37,000 cycles per second and thereabove has an extremely high impedance so that it may be said that the effective upper cut-off frequency limit of the low pass filter means 33 is at approximately 37,000 cycles. If we assume that the oscillation generator 28 produces output electrical oscillations of approximately 35,000 cycles, and the output radiation shown at 25 in FIG. 2 is of approximately 35,000 cycles, it will then be apparent that the upper cut-off frequency of the low pass filter means 33 has been set above said output frequency 35,000 cycles by approximately 2,000 cycles. This comprises the previously referred to upper frequency margin above the transmitted or output frequency, which is provided to allow for the maximum expected upward frequency shift produced as a result of Doppler effect under the extreme highway driving condition referred to hereinbefore, wherein the trailing carrier vehicle 21 is traveling at the maximum speed and the leading vehicle 22 is traveling at a minimum speed. Of course, the actual frequency values shown in FIG. 12 are illustrative only and are not to be considered in a limiting sense since actually the frequencies may be quite different from those shown in FIG. 12. It will be noted that the dotted line shown at 58 in FIG. 12 indicates the lower frequency cut-off limit point of the bandpass filter means shown in FIG. 2C and also in FIG. 9B under the representative conditions of use described hereinbefore.

It should be particularly noted that any attenuation in the amplitude of the radiation from the point where it leaves the output transducer 24 of FIG. 2 to the point where the reflected or return radiation 26 is received by the input or receiving transducer means 27 of FIG. 2 may be appropriately compensated for in any of the various forms of the present invention by various types of compensation or correction means, such as echo-ranging apparatus or the like, if desired, which may be either independent apparatus coupled to that illustrated in the figures of the drawings or which may actually comprise a part of the systems disclosed in the apparatus of the drawings, such as in FIGS. 2 or 9, by providing a sequencing or intermittent interrupter means in the transmitting or output portion of the apparatus adapted to interrupt the oscillation generator 28 of FIG. 2, the oscillatory electrical output signal therefrom, or the output from the output transducer 24 thereof after a short predetermined initial time interval and to subsequently repeat this cycle of operation over and over so that, in effect, the output radiation 25 will comprise brief pulses of such radiation. In such case, the input or receiving transducer means 27 will receive the reflected pulses of radiation 26 and will effectively compare the time of reception thereof with the time of transmission of the same pulse by the output transducer means 24 in a conventional echo-ranging manner to determine the distance between the trailing carrier vehicle 21 and the leading vehicle 22. Such comparison of the time of transmission of the output pulse of radiation 25 with the time of reception of return pulses of radiation 26 may be made in an echo-ranging comparator, such as is diagrammatically illustrated fragmentarily in simplified form at 59 in FIG. 13; parts corresponding to those of FIG. 2 being designated by similar reference numerals, followed by the letter, "n," however. Since such echo-ranging comparator apparatus, systems and means are well known in the art and since the literature and prior patents are replete with full disclosures of such echo-ranging comparator systems and apparatus, it is believed that no purpose would be served by unnecessarily increasing the length of this application by including full drawings of the internal structural details thereof and by including a corresponding detailed specific description thereof—particularly, since said internal structural details thereof do not touch upon the real inventive concept of the present invention.

It should be noted that FIG. 14 is a fragmentary view in simplified block diagrammatic and schematic form of just a portion of the apparatus of FIG. 2, although it is equally applicable to the apparatus of FIGS. 9 and 10, or any of the modifications thereof, and it merely comprises the provision of an arrangement for effectively coupling the unsafe distance sensing portion of the apparatus, such as illustrated in FIGS. 2, 9 and 10, or any of the variations thereof previously described, with respect to the steering system of the trailing carrier vehicle 21 in a manner such that the steering apparatus of the trailing carrier vehicle 21 effectively turns both the output or transmitting transducer means, generally designated at 24*l* in FIG. 14, and the input or receiving transducer means, generally indicated at 27*l* in FIG. 14, simultaneously and similarly in a direction corresponding to the direction in which the trailing carrier vehicle 21*l* will turn under the control of the vehicle steering system, generally designated in block diagrammatic and schematic form at 61 in FIG. 14, so that the apparatus will be effective for the unsafe distance sensing purposes previously described with respect to a leading vehicle, such as the leading vehicle shown at 22 in FIG. 1, for example, when they are both negotiating a long, smooth curve. In other words, this arrangement makes it possible for the output radiation 25*l* to be appropriately turned for proper impingement upon the rear end, such as that shown at 22R in FIG. 1, of a leading vehicle, such as that shown at 22 in FIG. 1, for the unsafe distance sensing purposes previously described.

It will be noted that, in the fragmentary simplified block diagrammatic and schematic form of such a system as shown in FIG. 14, said two transducer means 24*l* and 27*l* are mounted on a base plate 62 which is pivoted as indicated at 63 with respect to a front end, such as that shown at 21F in FIG. 1, of a trailing carrier vehicle, such as that shown at 21 in FIG. 1, for relative pivotal movement under the control of a double-action fluid powered actuator means, generally designated at 60 in FIG. 14, which has a connecting rod 64 pivotally connected, as indicated at 65, to an extension arm 66 connected to said rotatably mounted base plate 62. Of course, it is understood that said double action actuator means 60 is fixedly mounted with respect to the trailing carrier vehicle, such as that shown at 21 in FIG. 1, and that the piston 67 thereof is adapted to be oppositely actuated in accordance with whichever of the two fluid supply lines 68 and 69 is provided with pressurized fluid from a source thereof under the control of the vehicle steering system, generally designated at 61 in FIG. 14.

It will, of course, be understood that when the vehicle steering system 61 is of the fluid pressure type, such as a hydraulic type or pneumatic type or the like, a source of fluid under pressure comprises a part thereof, and this may be the source of fluid under pressure for supplying either of the two ducts 68 and 69 for appropriately operating the double action actuator means 60 so as to turn the base plate 62 in the same direction as the front wheels of the trailing carrier vehicle are turned by the vehicle steering system, fragmentarily shown in phantom at 21*l* in FIG. 14, generally designated at 61. The internal details of such an arrangement—that is, the valving coupled to the source of fluid pressure, comprising a part of the vehicle steering system 61, are not shown in detail in FIG. 14 since such arrangements are well known in the art and do not comprise an essential part of the real inventive concept disclosed in FIG. 14 which relates to the interrelationship or cooperative relationships of the vehicle steering system 61 with respect to the two transducer means 24*l* and 27*l* for causing same to be turned in the direction in which the trailing carrier vehicle is turned as a result of operation of the vehicle steering system 61. It should also be noted that the coupling between the vehicle steering system 61 and said transducer means 24*l* and 27*l* may be accomplished by other types of servomotor means, which are not necessarily of a hydraulic or fluid motor type, and also may be directly mechanically coupled, and additionally the vehicle steering systems itself, as generally designated in block diagrammatic form at 61, may be of a mechanically operated type rather than of a fluid pressure operated type, all within the broad scope of this aspect of the invention, as disclosed in FIG. 14.

It should be noted that, in a preferred form of the present invention, the output and receiver transducer means, 24 and 27 as shown in FIG. 2, should preferably be provided with highly directionally selective means, with said means of the output transducer 24 being positioned as nearly as possible on the center line of the trailing carrier vehicle 21 at a reasonably low level and being substantially exactly forwardly directed or very nearly so or with such a very slight centrally inclined angle as to, at any distance wherein the apparatus is expected to sense said output radiation 25, strike the rear end 22R of the leading vehicle 22 at a substantial central location so that substantially all of the output of the narrow beam of output radiation 25 will be reflected, as indicated at 26, back to the receiving or input transducer 27 and be received thereby, thus minimizing any radiation loss and also minimizing the possibility of reflection from extraneous objects other than the leading vehicle 22.

Of course, it should be noted that the output radiation 25 need not be acoustic radiation, but may be various other types of radiation. In particular, it should be noted that a coherent beam of electromagnetic radiation, such as can be produced by what are known in the art as "lasers" or "masers" (which comprise light amplifiers by stimulated emission of radiation and microwave amplifiers by stimulated emission of radiation) and which are capable of producing extremely narrow beams of output radiation, may be employed for the output transducer means 24, and a corresponding type of receiver or input transducer 27 responsive thereto may be employed in lieu of the acousto-electric type described hereinbefore in connection with the input receiver transducer means shown at 27 in FIG. 2. This type of arrangement is extremely advantageous since substantially the entire output radiation beam 25 will be reflected, as indicated at 26 in FIG. 2, and will be received by the input or receiving transducer means 27.

We claim:

1. A safe trailing distance maintenance apparatus for a trailing carrier vehicle, comprising: radiation producing and transmitting output transducer means adapted for mounting in a forwardly facing direction on a trailing carrier vehicle for producing an effectively forwardly emitting selective, narrow angle, forward output radiation; radiation receiving input and receiver transducer means adapted for mounting in a forwardly facing direction on said trailing carrier vehicle for receiving in a forwardly facing, directionally selective, narrow angle manner return radiation comprising reflected portions of said output radiation previously forwardly radiated and emitted from said output transducer means forwardly into rearwardly reflecting contact with the rear end of a leading vehicle positioned spacedly forwardly of said trailing carrier vehicle; threshold gate means having an input portion, an output portion, and an effectively adjustable gating point control portion, providing a minimum amplitude gating control point or value controlling the effective opening and closing of said threshold gate means with respect to the through passage of electrical signals received by said input portion of said threshold gate means through said threshold gate means and out of said output portion of said threshold gate means, said input portion of said threshold gate means being effectively connected with respect to the output of said input and receiver transducer means, and said output portion of said threshold gate means including an output circuit means adapted to be effectively opened by said threshold gate means when electrical signals received by said input portion of said threshold gate means are below said minimum amplitude gating control point or value determined by the adjustment of said gating point control portion of said threshold gate means and adapted to be effectively closed by said threshold gate means when such electrical signals received by said input portion of said threshold gate means are above said minimum amplitude gating control point or value of said adjustable gating point control portion of said threshold gate means; reference value means effectively coupled with respect to said gating point control portion of said threshold gate means in a manner adjustably determining and controlling the effective amplitude of the gating control point or value provided by said gating point control portion to said threshold gate means; and vehicle speed sensing means adapted to be connected with respect to said trailing carrier vehicle in a manner directly responsive to the speed thereof and adapted to produce an output which is a direct function of vehicle speed of said trailing carrier vehicle and which is effectively coupled to said reference value means in a manner controlling the operation of same in a manner which is an inverse function of the output of said vehicle speed sensing means and which correspondingly controls the amplitude of the gating control point of said threshold gate means in a similar manner which is an inverse function of the output of said vehicle speed sensing means such as to modify said minimum amplitude gating control point or value provided to said threshold gate means in a sense opposite that of the modification of the output of said vehicle speed sensing means whereby to cause said threshold gate means to effectively close said output circuit means only whenever a distance less than a predetermined safe distance, which is a function of vehicle speed, is reached and exists between said trailing carrier vehicle and said leading vehicle, said output terminal of said output circuit means being effectively provided with and effectively connected with respect to a perceptible warning signal-producing means for electrical energization thereof whenever said output circuit means is effectively closed by said threshold gate means, said output terminal of said output circuit means being effectively provided with and effectively connected with respect to vehicle speed control means carried by said trailing carrier vehicle for effectively reducing the forward speed thereof whenever said output circuit means is effectively closed by said threshold gate means.

2. Apparatus as defined in claim 1 wherein said perceptible warning signal producing means comprises a visibly perceptible warning signal-producing means mounted in said trailing carrier vehicle in a readily observable position for said electrical energization thereof whenever said output circuit means is effectively closed by said threshold gate means.

3. Apparatus as defined in claim 1 wherein said vehicle speed control means comprises servomotor means effectively coupled with respect to a vehicle braking system carried by said trailing carrier vehicle for reducing the speed thereof whenever said output circuit means is effectively closed by said threshold gate means.

4. Apparatus as defined in claim 1 wherein said perceptible warning signal producing means comprises a visibly perceptible warning signal-producing means mounted in said trailing carrier vehicle in a readily visibly observable position for said electrical energization thereof whenever said output circuit means is effectively closed by said threshold gate means, said vehicle speed control means comprising servomotor means effectively coupled with respect to a vehicle braking system carried by said trailing carrier vehicle for reducing the speed thereof whenever said output circuit means is effectively closed by said threshold gate means.

References Cited

UNITED STATES PATENTS

| 2,188,293 | 1/1940 | Williams | 343—112 X |
| 2,513,279 | 7/1950 | Bradley | 180—82.1 X |
| 2,804,160 | 8/1957 | Rashid | 180—82.1 |
| 2,841,782 | 7/1958 | McIlwain | 180—82.1 |
| 2,996,137 | 8/1961 | Chu et al. | 180—82.1 |
| 3,076,962 | 2/1963 | Norton | 343—112 X |
| 3,179,939 | 4/1965 | Castellini | 343—112 X |
| 2,699,834 | 1/1955 | O'Brien | 340—53 |
| 2,965,893 | 12/1960 | Barker | 343—7 |
| 2,974,304 | 3/1961 | Nordlund | 340—22 |
| 3,176,294 | 3/1965 | Merlo et al. | 343—7 |
| 3,182,311 | 5/1965 | Midlock | 343—7 |
| 3,210,726 | 10/1965 | Copsy | 340—33 |
| 2,943,316 | 6/1960 | Covely. | |
| 3,072,857 | 1/1963 | Thaler | 343—8 X |
| 3,182,312 | 5/1965 | Daniels | 343—7 |
| 3,187,328 | 6/1965 | Vetter | 343—7 |

KENNETH H. BETTS, *Primary Examiner.*

U.S. Cl. X.R.

340—53; 343—7